Patented June 3, 1930

1,761,624

UNITED STATES PATENT OFFICE

IVAN GUBELMANN, ROBERT J. GOODRICH, AND EDWARD T. HOWELL, OF SOUTH MILWAUKEE, WISCONSIN, ASSIGNORS TO THE NEWPORT COMPANY, OF CARROLLVILLE, WISCONSIN, A CORPORATION OF DELAWARE

PROCESS OF PREPARING COLORING MATTER OF THE DIBENZANTHRONE SERIES

No Drawing. Application filed July 7, 1928. Serial No. 291,133.

This invention relates to the process of preparing coloring matters by the interaction of oxidized dibenzanthrone and ethylene dibromide and is more particularly concerned with improvements in carrying out the reaction to give a product possessing more desirable properties and capable of dyeing cotton a more desirable hue than the hitherto described product of this reaction.

The oxidized dibenzanthrone with which this specification deals is well known in the art. It is prepared generally by treating dibenzanthrone in sulfuric acid solution and in the optional presence of boric acid with oxidizing agents, such as manganese dioxide or nitric acid. In the process generally preferred, this step is followed by the steps of pouring the reaction mass into water and partly reducing the same by means of sodium bisulfite. See for instance, U. S. Patent No. 1,093,427 to Isler and Balley, examples 1, 2 and 3. The structural formula of this product is probably that corresponding to dihydroxy-dibenzanthrone, thus

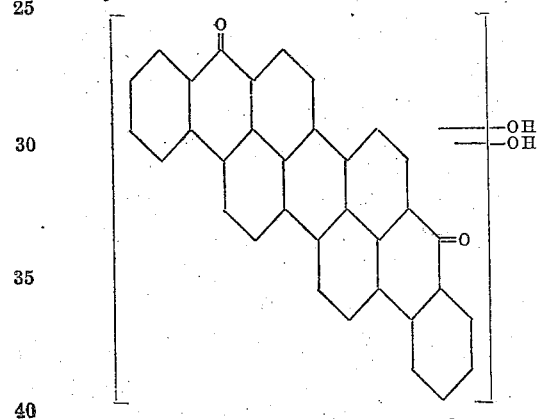

However, this formula has never been established with certainty, and it is, therefore, customary in the art to refer to this product as "oxidized dibenzanthrone" or "the oxidation product of dibenzanthrone". See for instance U. S. Patents Nos. 1,207,762; 1,505,912; 1,522,251; 1,531,261; 1,531,262; 1,551,849.

The product resulting from the reaction of this oxidation product and ethylene dibromide is probably an ether or a mixture of ethers. However, in view of the fact that the dibenzanthrone compound contains two reactive OH groups, while the ethylene compound contains two reactive bromine atoms, many reactions are theoretically possible depending upon whether one molecule of dibenzanthrone reacts with one or with two molecules of ethylene dibromide, or vice versa. Furthermore, the products may be completely or only partly eitherified. It is therefore impossible at present to determine the exact structure of the products produced by the process of this invention.

It is an object of this invention to provide an improved and more economically practical method for producing dyestuffs of the dibenzanthrone series of excellent dyeing and fastness properties.

Other and further important objects of this invention will be apparent from the disclosures in the specification and the appended claims.

In U. S. Patent No. 1,531,261, there is described a process for preparing a similar dyestuff by the interaction of ethylene dibromide and the oxidation product of dibenzanthrone in the presence of sodium carbonate and nitrobenzene. In carrying out the reaction, as specified in this patent, there are experienced certain objectionable features which are overcome to a large extent by the use of the present invention.

By following the method of the above patent, there results a considerable destruction of ethylene dibromide, thereby rendering the process expensive and difficult to carry to completion. The resulting shades as a consequence thereof, are not fast to acid and show to a small degree the characteristics of oxidized dibenzanthrone.

We have found that, in carrying out the condensation with ethylene dibromide, the use of milder alkaline agents than sodium carbonate exerts a highly beneficial effect upon the results obtained. The milder agents referred to include the alkali metal salts of weak organic acids stronger than carbonic acid, such as sodium formate, sodium benzoate, sodium acetate and the like. They may be used singly or as mixtures, or they may be used in conjunction with a limited amount of sodium carbonate. There results with the use of these milder alkaline salts, or "buffers," a speeding up of the condensation, which is accompanied by a diminution in the quantity of by-products and by a saving in raw material and labor. We have noted in the speeding up of the condensation a better recovery of the materials and a greater completion of the reaction, as evidenced by the fact that the dyeing of the final product on cotton shows less change in hue upon treatment with acids. The product obtained by the improved method may be isolated directly in a relatively high state of purity. The isolated product may be further purified if desired to give a purified product possessing even more desirable properties than the crude product by recrystallizing from suitable solvents.

Without limiting our invention to any particular procedure, the following examples in which parts by weight are given, will serve to illustrate our method in its preferred form.

Example 1

10 parts of sodium acetate crystals and an amount of aqueous paste equivalent to 10 parts of oxidized dibenzanthrone, are added to 100 parts of ethylene dibromide. This mixture is heated to the boiling point and distilled. The ethylene dibromide distilling over is returned to the mixture and the water discarded. This distilling is continued until practically no more water distills over. The mass is then gently refluxed until a test portion, on dyeing, shows practically no change in hue upon treatment with dilute acid. The ethylene dibromide is then distilled off in the presence of water. The residue remaining is filtered off, washed with water and dried. The product obtained is a dark blue powder, soluble in concentrated sulfuric acid imparting thereto a bordeaux coloration. It dyes cotton from an alkaline hydrosulfite vat blue shades, which upon treatment with suitable oxidizing agents may be developed to a navy blue showing very little, if any, change in hue upon treatment with dilute acid.

Example 2

10 parts of sodium acetate crystals and an amount of aqueous paste corresponding to 10 parts of oxidized dibenzanthrone are added to 100 parts of ethylene dibromide. The mixture is dehydrated as in Example 1. After the dehydration is complete, the distillation is continued, running the ethylene dibromide through an alkaline solution before returning it to the reaction mass. Distilling and returning the alkali washed ethylene dibromide are continued until a test portion of the mass on dyeing gives practically no change in hue upon treatment with dilute acid. The product is isolated as in Example 1 and is practically identical with it.

Example 3

10 parts of sodium acetate crystals and an amount of aqueous paste equivalent to 10 parts of oxidized dibenzanthrone are added to 100 parts of ethylene dibromide. The mass is dehydrated as in Example 1. 5 parts of dry finely powdered sodium carbonate are then added and the mass refluxed until a test portion on dyeing gives practically no change in hue upon treatment with dilute acid. The product is isolated as in Example 1 and is practically identical with it.

Example 4

An amount of aqueous paste equivalent to 10 parts of oxidized dibenzanthrone is added to 100 parts of ethylene dibromide and dehydrated as in Example 1. There are then added 5 parts of dry finely powdered sodium benzoate and 5 parts of finely ground sodium carbonate. The reaction mixture is then refluxed until a test portion on dyeing gives practically no change in hue upon treatment with dilute acid. The product is isolated as in Example 1 and is practically identical with it.

Example 5

5 parts of finely ground sodium formate and an amount of aqueous paste equivalent to 10 parts of oxidized dibenzanthrone are added to 100 parts of ethylene dibromide and dehydrated as in Example 1. There are then added 5 parts of finely ground dry sodium carbonate and the mixture is refluxed till a test portion on dyeing shows practically no change in hue upon treatment with dilute acid. The reaction mass is treated as in Example 1 and the product obtained is practically identical with it.

Example 6

10 parts of dry product as obtained in example 1 are dissolved in 200 parts of sulfuric acid 66° Bé. at room temperature. Water or diluted sulfuric acid is now added in sufficient quantity to give a sulfuric acid of about 81% strength, maintaining the temperature at about 20 to 40° C. The mixture is then agitated for about 4 hours at room temperature and filtered. The acid filter cake obtained is suspended in 500 parts of water and stirred until disintegrated. It is then filtered off again washed with water and dried. The purified product thus obtained possesses more desirable properties for many uses than the crude product.

In Example 6, other concentrations of acids may be employed both for the dissolving and precipitation of the product. Whereas we have found that in isolating in about 81% strength sulfuric acid very satisfactory results are obtained, we do not wish to limit our method to those exact concentrations. In the dilution of sulfuric acid solution to precipitate the product, the optimum dilution of the acid will depend largely upon the amount of impurity present and the exact dilution for variable products must be found by trial.

We are likewise aware that numerous other changes may be made in the process without departing from the spirit of the invention; that is, other "buffers" than the specific ones mentioned may be employed. We therefore do not purpose limiting the invention granted hereon other than as necessitated by the prior art.

We claim as our invention:

1. The process of preparing coloring matters of the dibenzanthrone series, which comprises treating oxidized dibenzanthrone with ethylene dibromide in the presence of an alkali metal salt of a weak organic acid stronger than carbonic acid.

2. The process of preparing coloring matters of the dibenzanthrone series, which comprises heating oxidized dibenzanthrone with ethylene dibromide in the presence of sodium acetate.

3. The process of preparing coloring matters of the dibenzanthrone series, which comprises heating oxidized dibenzanthrone with ethylene dibromide in the presence of an alkali metal salt of a weak organic acid stronger than carbonic acid, forming a suspension of the product so obtained in dilute sulfuric acid, agitating and recovering the suspended product.

4. The process of preparing coloring matters of the dibenzanthrone series, which comprises heating oxidized dibenzanthrone with ethylene dibromide in the presence of an alkali metal salt of a weak organic acid stronger than carbonic acid forming a suspension of the product so obtained in about 81% sulfuric acid, agitating and recovering the suspended product.

5. The process of preparing coloring matters of the dibenzanthrone series, which comprises heating oxidized dibenzanthrone with ethylene dibromide in the presence of sodium acetate, forming a suspension of the product so obtained in dilute sulfuric acid, agitating and recovering the suspended product.

6. The process of preparing coloring matters of the dibenzanthrone series, which comprises heating oxidized dibenzanthrone with ethylene dibromide in the presence of sodium acetate, forming a suspension of the product so obtained in about 81% sulfuric acid, agitating and recovering the suspended product.

7. The process of preparing coloring matters of the dibenzanthrone series, which comprises heating oxidized dibenzanthrone with ethylene dibromide in the presence of an alkali metal salt of an organic acid stronger than carbonic acid at the refluxing temperature of the mixture.

8. The process of preparing coloring matters of the dibenzanthrone series, which comprises heating oxidized dibenzanthrone with ethylene dibromide in the presence of sodium acetate at the refluxing temperature of the mixture.

In testimony whereof we have hereunto subscribed our names at Carrollville, Milwaukee County, Wisconsin.

IVAN GUBELMANN.
ROBERT J. GOODRICH.
EDWARD T. HOWELL.